United States Patent [19]
Abbott et al.

[11] Patent Number: 5,375,145
[45] Date of Patent: Dec. 20, 1994

[54] MULTI-MODE GAIN CONTROL LOOP FOR PRML CLASS IV SAMPLING DATA DETECTION CHANNEL

[75] Inventors: William L. Abbott, Portola Valley; Kenneth E. Johnson; Hung C. Nguyen, both of San Jose, all of Calif.

[73] Assignee: Quantum Corporation, Milpitas, Calif.

[21] Appl. No.: 936,742

[22] Filed: Aug. 27, 1992

[51] Int. Cl.$^5$ .............................................. H04L 27/08
[52] U.S. Cl. ...................................... 375/98; 375/18; 455/234.1
[58] Field of Search ..................... 375/98, 18; 330/129; 455/239.1, 245.1, 234.1, 234.2, 240.1, 245.2; 360/46, 51, 65; 364/602, 807

[56] References Cited

U.S. PATENT DOCUMENTS

| | | | |
|---|---|---|---|
| 4,213,097 | 7/1980 | Chiu et al. | 330/51 |
| 4,499,586 | 2/1985 | Cafarella et al. | 375/98 |
| 4,504,872 | 3/1985 | Peterson | 360/40 |
| 4,551,688 | 11/1985 | Craiglow | 330/280 |
| 4,604,645 | 8/1986 | Lewis, Jr. | 358/27 |
| 4,644,564 | 2/1987 | Dolivo et al. | 375/18 |
| 4,750,058 | 6/1988 | Hirt et al. | 360/46 |
| 4,847,871 | 7/1989 | Matsushita et al. | 375/94 |
| 4,989,074 | 1/1991 | Matsumoto | 455/240.1 |
| 5,187,809 | 2/1993 | Rich et al. | 375/98 |
| 5,258,933 | 11/1993 | Johnson et al. | 364/602 |

OTHER PUBLICATIONS

Wood, Peterson, "Viterbi Detectionof Class IV Partial Response on a Magnetic Recording Channel," *IEEE Trans. on Communicatins*, vol. COM 34 No. 5 May 1986, pp. 454-461.

Schmerbeck, Richetta, Smith, "A 27 MH$_2$ Mixed Analog/Digital Magnetic Recording Channel BSP Using Partial Response Signalling with Maximum Likelihood Detection" *Proc 1991 IEEE Int'l Solid State Circuits Conf.* pp. 136-137, 304, and pp. 97, 256 Slide Supplement.

Wood, Ahigrim, Hallarnasek, Swenson, "An Experimental Eight-Inch Disc Drive with 100 m Bytes per Surface" *IEEE Trans. on Magnetics* vol. MAG-20, No. 5, Sep. 1984 pp. 698-702.

Kubayashi, Tang, "Application of Partial-Response Channel Coding to Magntic Recording Systems," *IBM Journal of Research and Develop.*, Jul. 1970, pp. 368-375.

Kobayshi, "Application of Probabilistic Decoding to Digital Magnetic Recording Systems" *IBM Journal of Research and Develop.* Jan. 1971, pp. 64-74.

Dolivo, "Signal Processing of High-Density Digital Magnetic Recording" *Proc. 1989 IEEE VLSI and Computer Peripherals*, Hamburg, West Germany, May 1989 pp. 1-91 to 1-96.

Coker, Galbraith, Kerwin, Rae, Ziperovich, "Implementation of PRML in aRigid Disk Drive" *IEEE Trans. of Magnetics*, vol. 27, No 6, Nov. 1991.

Cideciyan, Dolivo, Hermann, Hirt, Schott, "A PRML System for Digital Magnetic Recording" *IEEE Journal on Selected Areas of Communication*, vol. 10, No. 1, Jan. 1992, pp. 38-56.

*Primary Examiner*—Stephen Chin
*Assistant Examiner*—T. Ghebretinsae
*Attorney, Agent, or Firm*—David B. Harrison

[57] ABSTRACT

A multi-mode gain control loop for a PR4, ML data channel, such as one included in a magnetic disk data storage device, includes an input for receiving from a source an analog signal stream including coded data to be detected; a VGA for amplifying the analog signal stream; an analog to digital converter for receiving the analog signal stream and for generating and putting out data samples therefrom; an analog gain control loop connected to generate an analog gain control from the analog data stream during a data non-read mode of the channel, to store the analog gain control in a storage circuit, and to apply the stored analog gain control constantly to control the VGA; and a digital gain control loop connected to generate gain vernier correction values from the data samples and for applying the gain vernier correction values through a gain DAC to provide an offset control to the VGA during a data read mode of the channel.

20 Claims, 10 Drawing Sheets

MULTI-MODE GAIN CONTROL LOOP FOR PRML CLASS IV SAMPLING DATA DETECTION CHANNEL

REFERENCE TO RELATED APPLICATION

The present invention is related to U.S. patent application Ser. No. 07/937,054 filed on Aug. 27, 1992 and entitled DISK DRIVE USING PRML CLASS IV SAMPLING DATA DETECTION WITH DIGITAL ADAPTIVE EQUALIZATION, the disclosure of which is hereby incorporated herein by reference.

FIELD OF THE INVENTION

The present invention relates to gain control methods and circuits for a data sampling detection system. More particularly, the present invention provides a multi-mode gain control loop for a data channel employing 8/9ths coding and synchronized, partial response, maximum likelihood ("PRML") detection, such as a data channel within a miniature, very high capacity hard disk drive data storage subsystem employing a partial response, class IV, maximum likelihood (hereinafter referred to as "PR4,ML") data channel having adaptive digital gain loop filtering.

BACKGROUND OF THE INVENTION

Conventional disk drives have employed peak detection techniques in order to recover digital data written as saturation recording onto a magnetizable surface media of a rotating disk. With peak detection techniques, it is necessary to space flux transitions sufficiently apart so that analog peaks in the recovered data stream may be identified and the corresponding data recovered. In order to achieve reasonable bandwidths in data channels, it has been customary to employ data coding techniques. One such technique has been to use a (1,7) RLL code. In this code, flux transitions can be no closer together than every other clock bit time period ("bit cell") nor farther apart than eight clock bit cells. (1,7) RLL codes are known as "rate two-thirds" codes, in the sense that two data bits are coded into three code bits. Thus, with a rate two-thirds code, one third of the user storage area of the storage disk is required for code overhead.

One way to decrease the code overhead is to employ a code in which flux transitions are permitted in adjacent bit cells. One such code is a (0,4,4) code. The (0,4,4) code can be implemented as a rate eight-ninths code, meaning that nine code bits are required for eight incoming data bits. (Theoretically, the (0,4,4) code capacity is somewhat higher, approaching 0.961). Thus, this code is significantly more efficient than a rate two-thirds code, such as (1,7) RLL. Use of a (0,4,4) code results in a significantly greater net user data storage capacity on the disk surface, given a constant bit cell rate. However, when flux transitions occur in adjacent bit cells, as is the case with a (0,4,4) code, intersymbol interference ("ISI") results. Conventional peak detection techniques are not effective or reliable in recovering data coded in an eight-ninths code format, such as (0,4,4).

The zero in the (0,4,4) code denotes that flux transitions may occur in directly adjacent bit cells of the coded serial data stream. The first "4" denotes that a span of no more than four zeros occurs between ones in the encoder output. The second "4" signifies that the bit cell stream has been divided into two interleaves: an even interleave, and an odd interleave; and, it denotes that there can be a span of no more than four zeros between ones in the encoder output of either the odd interleave or the even interleave.

It is known that partial response signalling enables improved handling of ISI and allows more efficient use of the bandwidth of a given channel. Since the nature of ISI is known in these systems, it may be taken into account in the decoding/detection process. Partial response transmission of data lends itself to synchronous sampling and provides an elegant compromise between error probability and the available spectrum. The partial response systems described by the polynomials $1+D$, $1-D$, and $1-D^2$ are known as duobinary, dicode and class IV (or "PR4"), respectively, where D represents one bit cell delay and $D^2$ represents 2 bit cell delays (and further where $D = e^{-j\omega T}$, where $\omega$ is a frequency variable in radians per second and T is the sampling time interval in seconds). The PR4 magnitude response plotted in FIG. 1 hereof and given the notation $|1-D^2|$ emphasizes midband frequencies and results in a read channel with increased immunity to noise and distortion at both low and high frequencies. In magnetic recording PR4 is a presently preferred partial response system, since there is a close correlation between the idealized PR4 spectrum as graphed in FIG. 1, and the natural characteristics of a magnetic data write/read channel.

In order to detect user data from a stream of coded data, not only must the channel be shaped to a desired partial response characteristic, such as the PR4 characteristic, but also a maximum likelihood ("ML") sequence estimation technique is needed. The maximum likelihood sequence estimation technique determines the data based upon an analysis of a number of consecutive data samples taken from the coded serial data stream, and not just one peak point as was the case with the prior peak detection methods.

One maximum likelihood sequence estimation algorithm is known as the Viterbi detection algorithm, and it is well described in the technical literature. Application of the Viterbi algorithm to PR4 data streams within a magnetic recording channel is known to improve detection of original symbol sequences in the presence of ISI and also to improve signal to noise ratio over comparable peak detection techniques.

In an article entitled "Viterbi Detection of Class IV Partial Response on a Magnetic Recording Channel" appearing in *IEEE Trans. on Communications*, vol. Com-34, No. 5, May 1986, pp. 434–461, authors Wood and Peterson explain the derivation of PR4 as being formed by subtracting waveforms two bit intervals apart, thereby forming an analog domain ternary "eye" pattern graphed herein in FIG. 2.

The Viterbi algorithm provides an iterative method of determining the "best" route along the branches of a trellis diagram, such as the one shown in FIG. 3 hereof, for example. If, for each trellis branch, a metric is calculated which corresponds to the logarithm of the probability for that branch, then the Viterbi algorithm may be employed to determine the path along the trellis which accumulates the highest log probability, i.e., the "maximum likelihood" sequence. Since the Viterbi algorithm operates upon a sequence of discrete samples $\{y_k\}$, the read signal is necessarily filtered, sampled, and equalized.

While PRML has been employed in communications signalling for many years, it has only recently been applied commercially within magnetic hard disk drives. One recent application is described in a paper by Schmerbeck, Richetta, and Smith, entitled "A 27 MHz Mixed Analog/Digital Magnetic Recording Channel DSP Using Partial Response Signalling with Maximum Likelihood Detection", *Proc.* 1991 *IEEE International Solid State Circuits Conference,* pp. 136–137, 304, and pp. 96, 97 and 265 Slide Supplement. While the design reported by Schmerbeck et al. appears to have worked satisfactorily, it has drawbacks and limitations which are overcome by the present invention. One drawback of the reported approach was its design for transducers of the ferrite MiG type or of the magnetoresistive type which simplified channel equalization requirements. Another drawback was the use of a single data transfer rate which significantly simplified channel architecture. A further drawback was the use of a dedicated servo surface for head positioning within the disk drive, thereby freeing the PR4, ML data channel from any need for handling of embedded servo information or for rapid resynchronization to the coded data stream following each embedded servo sector.

Prior Viterbi detector architectures and approaches applicable to processing of data sample sequences taken from a communications channel or from a recording device are also described in the Dolivo et al. U.S. Pat. No. 4,644,564. U.S. Pat. No. 4,504,872 to Peterson describes a digital maximum likelihood detector for class IV partial response signalling. An article by Roger W. Wood and David A. Peterson, entitled: "Viterbi Detection of Class IV Partial Response on a Magnetic Recording Channel" *IEEE Trans. on Comm.* Vol. Com-34, No. 5, May 1986, pp. 454–466 describes application of Viterbi detection techniques to a class IV partial response in a magnetic recording channel. An article by Roger Wood, Steve Ahigrim, Kurt Hallarnasek and Roger Stenerson entitled: "An Experimental Eight-Inch Disc Drive with One-Hundred Megabytes per Surface", *IEEE Trans. on Magnetics,* Vol. Mag-20, No. 5, September 1984, pp 698–702 describes application of class IV partial response encoding and Viterbi detection techniques as applied within an experimental disk drive. A digital Viterbi detector capable of withstanding lower signal to noise ratios is described in Matsushita et al. U.S. Pat. No. 4,847,871. These documents are representative examples of the known state of the prior art.

In sample based data detection systems, such as PR4,ML, the analog read signal is sampled by an analog to digital converter ("A/D"). The conversion process includes quantization according to the number of bits in the A/D so that, for optimal performance, it is desirable to adjust the amplitude of the analog read signal at the input to the A/D to a level that fully uses the available dynamic range thereof. This is best done with an automatic gain control ("AGC") circuit that senses amplitude as reported by the signal samples since they determine the recovered information content.

One prior approach to gain control within a PR4,ML channel has been proposed by workers at IBM. This prior approach is described in Hirt et al. U.S. Pat. No. 4,750,058 entitled: "Gain Control Circuitry for Readback Apparatus in a PRML Magnetic Recording System." Other facets of this approach are described in an article by Coker et al, entitled "Implementation of PRML in a Rigid Disk Drive", *IEEE Trans. on Magnetics,* Vol. 27, No. 6, November 1991, pp 4538–4543. This prior approach has several drawbacks. First, an analog loop filter is active during both non-read mode and during read mode when data samples are available. The use of an analog loop filter in the gain loop during read mode makes it somewhat cumbersome to change loop compensation "on the fly". In addition, the analog gain control loop is susceptible to amplitude offset errors. In other words, the DAC control word provides a gain error value that is put into the analog loop filter. If the DAC word that corresponds to zero gain error does not produce exactly zero input to the loop filter, the system is left with an inherent gain offset or bias. A system with a digital loop filter will not exhibit this drawback since the DAC output directly controls the VGA.

In addition, failure of this prior approach to employ update rate scaling techniques required that the gain DAC be capable of operating at the basic data sample clocking rate, thus requiring greater design complexity and power consumption, and leaving the gain loop more susceptible to noise and transients.

Thus, a hitherto unsolved need has arisen for an improved gain control loop for controlling a sampled data detection system, such as a PR4,ML channel within a high performance, very high capacity, low servo overhead disk drive data storage subsystem.

SUMMARY OF THE INVENTION

A general object of the present invention is to provide an improved gain control loop for a sampled data detection system.

A more specific object of the present invention is to provide a gain loop for a PR4, ML channel within e.g. a magnetic disk drive which uses digital samples to determine amplitude during a data read mode, and which uses an analog AGC control loop in a nonread mode.

Another object of the present invention is to provide a multi-mode analog/digital gain control loop which is less sensitive to variations in temperature, power supply, components and other tolerances.

A further object of the present invention is to provide a gain control loop for a sampled data detection system wherein the gain loop employs a digital loop filter having programmable characteristics which may be immediately changed by loading registers, or by switching between alternative registers for "on the fly" changes in the gain control loop.

Another related object of the present invention is to provide a gain control loop for a sampled data detection system in which a gain loop digital filter eliminates errors due to bias and offset otherwise present in analog loop filter implementations.

One more object of the present invention is to use digital samples to determine gain correction needed to control a sampled data channel and to employ update rate scaling to reduce the clocking rate of a gain loop control DAC during read mode in order to reduce power consumption, design complexity and susceptibility to glitch energy (transients) and to noise.

Yet another object of the present invention is to provide a gain loop for controlling a sampled data detection system, such as a PR4,ML data channel in a magnetic disk data storage system, which effectively combines an analog gain control which remains static during read mode, and a digital vernier control during read mode to provide a fine adjustment to the analog loop set point, thereby overcoming a problem otherwise associated with controlling a variable gain amplifier ("VGA") of the data channel when digital samples may be unavailable or asynchronous, as occurs in disk drives employing embedded servo sectors containing servo data recorded asynchronously with regard to user data.

Yet a further object of the present invention is to provide a multi-stage VGA for level adjustment within a sampled data detection channel wherein one VGA applies an analog gain loop correction to an incoming analog data stream, and a subsequent VGA applies a vernier gain adjustment to the analog data stream derived and filtered digitally from data samples taken from the stream.

In accordance with principles of the present invention, a multi-mode gain control loop for a PR4,ML data channel, such as one included in a magnetic disk data storage device, includes an input for receiving from a source an analog signal stream including coded data to be detected; a VGA for amplifying the analog signal stream; an analog to digital converter for receiving the analog signal stream and for generating and putting out data samples therefrom; an analog gain control connected to generate an analog gain error from the analog data stream during a data non-read mode of the channel, to store the analog gain error in a storage circuit, and to apply the stored analog gain error constantly to control the VGA; and a digital gain control connected to generate gain error values from the data samples and for applying the gain error values through a gain DAC to provide an offset control to the VGA during a data read mode of the channel.

In one aspect of the present invention, the digital gain loop further comprises an update rate scaler circuit function for scaling the gain sample values into scaled gain sample values having a clocking rate lower than a clocking rate of the data samples, and for applying the resultant scaled gain sample values to the gain DAC.

In another aspect of the present invention, read mode includes an initial gain acquisition sub-mode followed by a gain tracking sub-mode, and the digital gain loop further comprises an acquisition sub-mode gain error quantization circuit connected to provide gain quantization values from the data samples during acquisition sub-mode and a tracking sub-mode gain error quantization circuit connected to provide gain quantization values from the data samples during tracking sub-mode, the gain error quantization values being converted into the gain sample values by the digital gain loop.

In still one more aspect of the present invention, the analog to digital converter puts out raw digital data samples and a digital FIR filter receives, filters and conditions the raw digital data samples in order to produce conditioned data samples, the digital gain loop being connected to receive the conditioned data samples.

In yet another aspect of the present invention, the VGA circuit comprises a first VGA amplifier controlled by the analog gain control value from the analog loop, and a second VGA amplifier controlled by an analog of the gain sample values.

These and other objects, advantages, aspects and features of the present invention will be more fully understood and appreciated upon consideration of the following detailed description of a preferred embodiment, presented in conjunction with the accompanying drawings.

In the electrical block diagrams briefly described above, various vertical boxes containing hatching sometimes appear. In some but not all instances, these boxes are described in the following text. In all cases, these boxes represent clock cycle delay registers. Thus, by counting the number of vertical hatched boxes within a particular block or path, the reader will determine the number of clock cycle delays.

SYSTEM OVERVIEW

Figure 4:
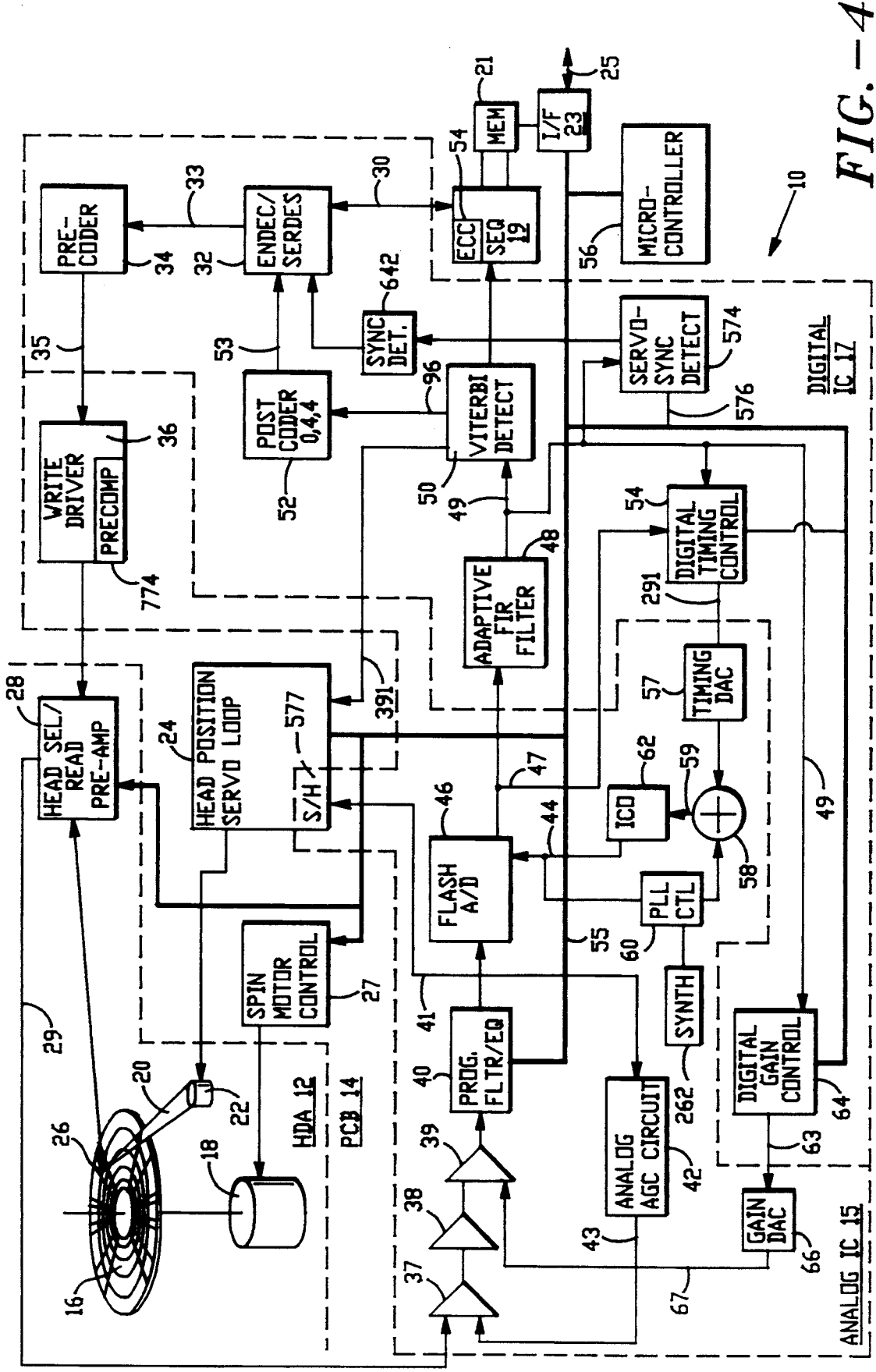
FIG. 4 is a simplified overall system block diagram of a disk drive including a PR4, ML write/read channel architecture incorporating principles and aspects of the present invention.

With reference to FIG. 4, an exemplary high performance, high data capacity, low cost disk drive 10 incorporating a programmable and adaptive PR4,ML write/read channel in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. patent application Ser. No. 07/881,678, filed on May 12, 1992, and entitled "Hard Disk Drive Architecture". The disclosures of these patents and this application are incorporated herein by reference thereto.

The electronics PCB 14 physically supports and electrically connects the circuitry for an intelligent interface disk drive subsystem, such as the drive 10. The electronics circuitry contained on the PCB 14 includes an analog PR4, ML read/write channel application-specific integrated circuit (ASIC) 15, a digital PR4, ML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 58 for controlling operations of the sequencer 19, interface 23, a serve loop 24, a spindle motor controller 27, a programmable analog filter/equalizer 40, adaptive FIR filter 48, Viterbi detector 50, and a digital timing control 54 as well as a digital gain control 64. The micro-controller 56 is provided with direct access to the DRAM memory 21 via the sequencer/memory controller 19 and may also include on-board and outboard read only program memory, as may be required or desired.

The printed circuit board 14 also carries circuitry related to the head positioner servo 24 including e.g. a separate microprogrammed digital signal processor (DSP) for controlling head position based upon detected actual head position information supplied by a servo peak detection portion of the PR4,ML read channel and desired head position supplied by the microcontroller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g. thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PR4, ML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g. sputter-deposited with a suitable multi-layer magnetic thin film and a protecting carbon overcoat in conventional fashion, for example. Other disks and magnetic media may be employed, including plated media and or spin-coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 4 exteriorly of the HDA 12 in an arrangement as described in the referenced copending U.S. patent application Ser. No. 07/881,678, filed on May 12, 1992, and entitled "Hard Disk Drive Architecture".

A bidirectional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4 precoding algorithm $1/(1 \oplus D^2)$. The precoded data is then passed over a path 35 to a write driver circuit 36 within the analog IC 15 wherein it is amplified and precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, see FIGS. 5 and 6. Embedded servo patterns are written by a servo writer, preferably in accordance with the methods described in a commonly assigned U.S. Pat. No. 5,170,299 filed on Aug. 17, 1990, entitled "Edge Servo For Disk Drive Head Positioner," now U.S. Pat. No. 5,170,299, the disclosure thereof being hereby incorporated by reference.

Returning to FIG. 4, during playback, flux transitions sensed by the e.g. thin film data transducer head 26 as it flies in close proximity over the selected data track 71 are preamplified by the read preamplifier circuit 28. The preamplified analog signal (or "read signal") is then sent to the analog IC 15 on a path 29 and into an analog variable gain amplifier (VGA) 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples {$x_k$}.

Figure 1:
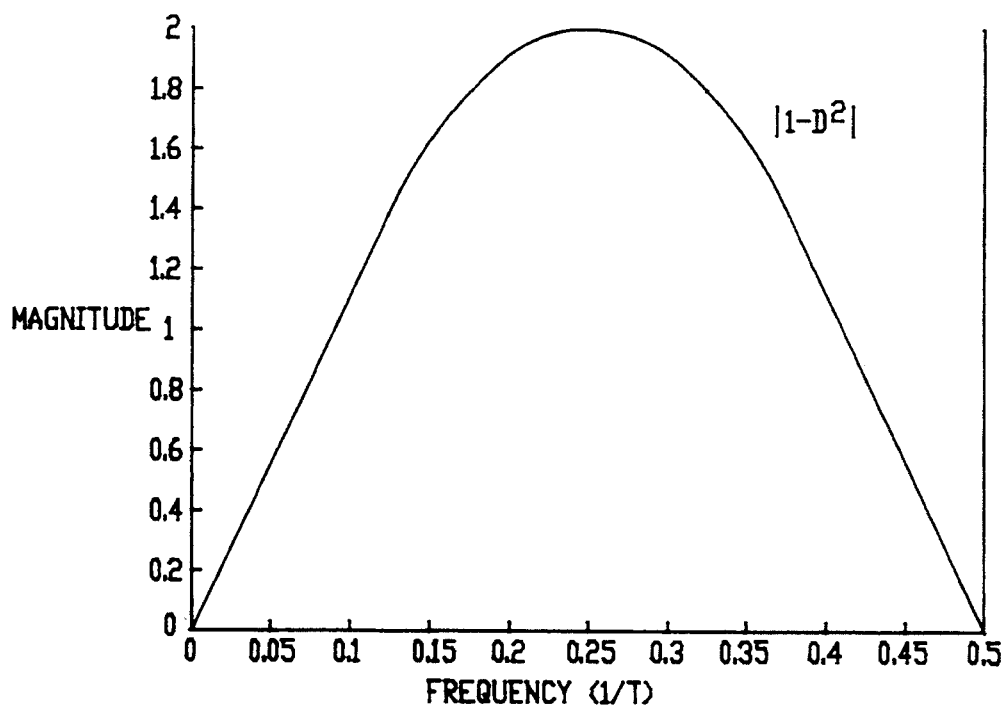
FIG. 1 is a graph of an idealized PR4 channel magnitude response spectrum.
Figure 2:
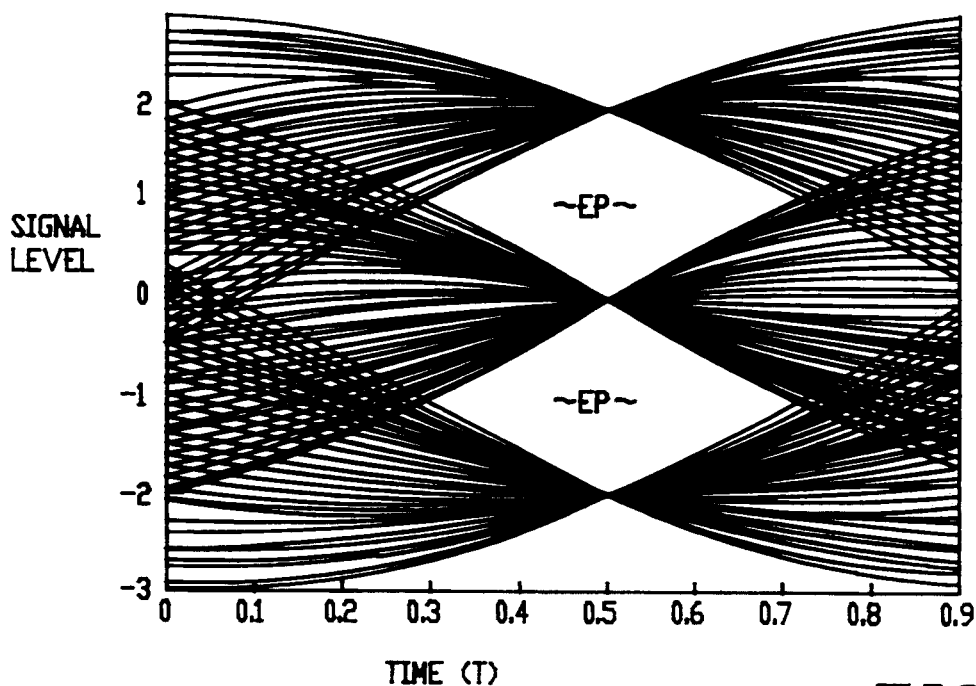
FIG. 2 is an exemplary ternary or "eye" diagram illustrating detection of signal levels in a PR4 channel.
Figure 3:
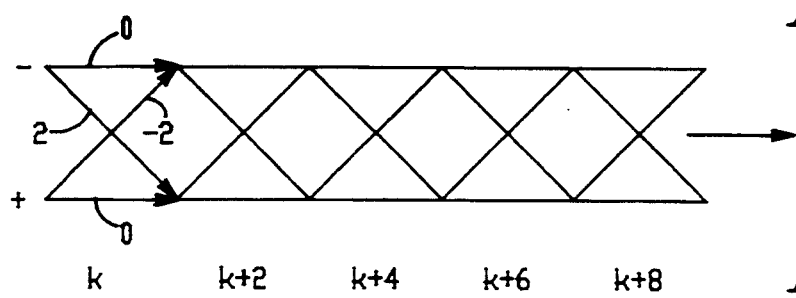
FIG. 3 is a trellis diagram employed by a Viterbi detector in detecting a maximum likelihood data sequence occurring within one interleave of a PR4 data stream.

The FIR filter 48 employs adaptive filter coefficients for filtering and conditioning the raw data samples {$x_k$} in accordance with the desired PR4 channel response characteristics, as plotted in FIG. 1, in order to produce filtered and conditioned samples {$y_k$}. The bandpass filtered and conditioned data samples {$y_k$} leaving the filter 48 are then passed over a path 49 to the Viterbi detector 50 which detects the data stream, based upon the Viterbi maximum likelihood algorithm employing a lattice pipeline structure implementing a trellis state decoder of the type illustrated in FIG. 3, for example. At this stage, the decoded data put out on a path 96 is in accordance with a (0,6,5) coding convention. A post-coder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and puts out eight bit user bytes which then pass into the sequencer 19 over the data path 30.

In order for the present system to work properly, the raw data samples {$x_k$} must be taken on the incoming analog signal waveform at precisely proper, regular locations. A dual mode timing loop is provided to control the frequency and phase of the flash analog to digital converter 46. The timing loop includes an analog timing control circuit 60, and a digital timing control circuit 54 and a timing DAC 57. A timing phase locked synthesizer circuit 262 supplies synthesized timing signals to the control circuit 60 and a timing reference signal to a summing junction 58. A sum put out by the summing junction 58 controls a current controlled oscillator 62 in order to clock the A/D 46. The oscillator 62 also includes zero phase start circuitry to provide controlled startup at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

DATA RECORDING PATTERN

Figure 5:
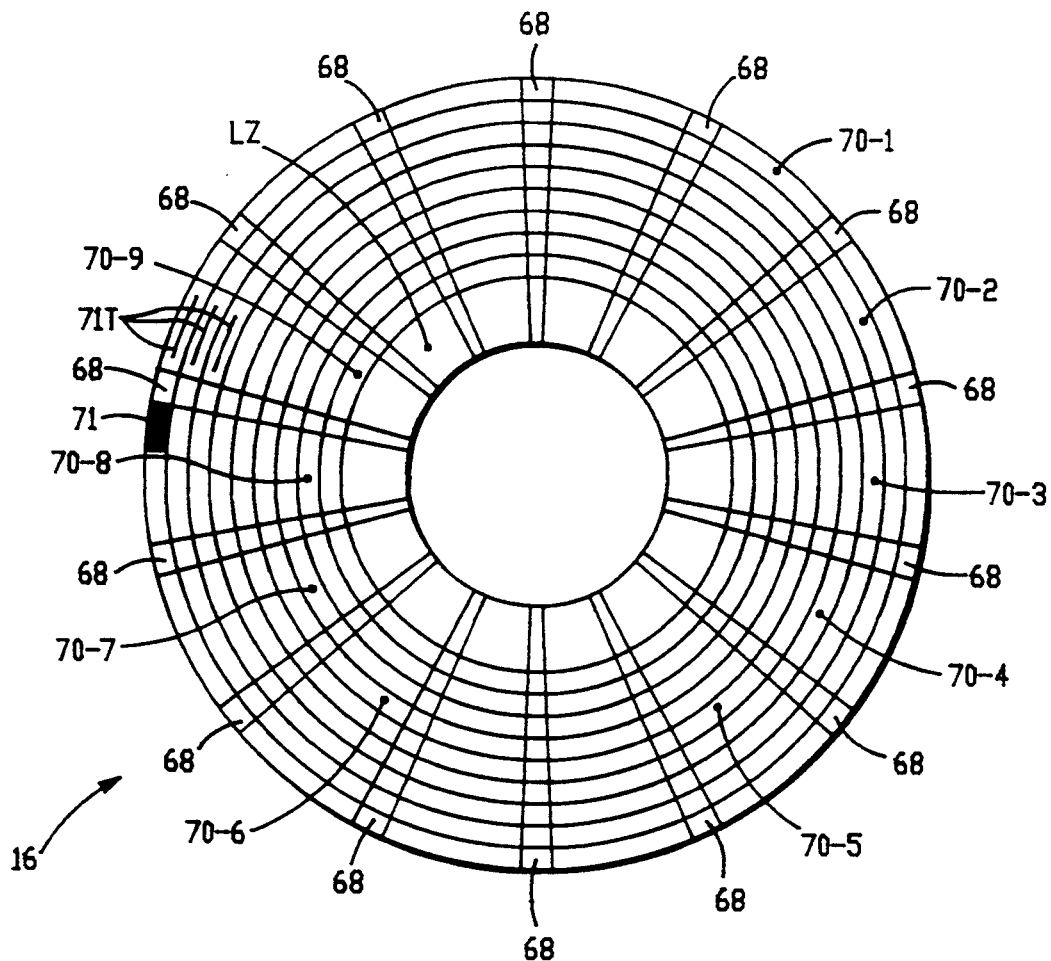
FIG. 5 is a simplified diagram of a recording pattern formed on a data storage surface of the FIG. 4 disk drive, illustrating data zones and embedded servo sector patterns.

As shown in FIG. 5, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70-7, 70-8 and 70-9, for example. In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

Figure 6:
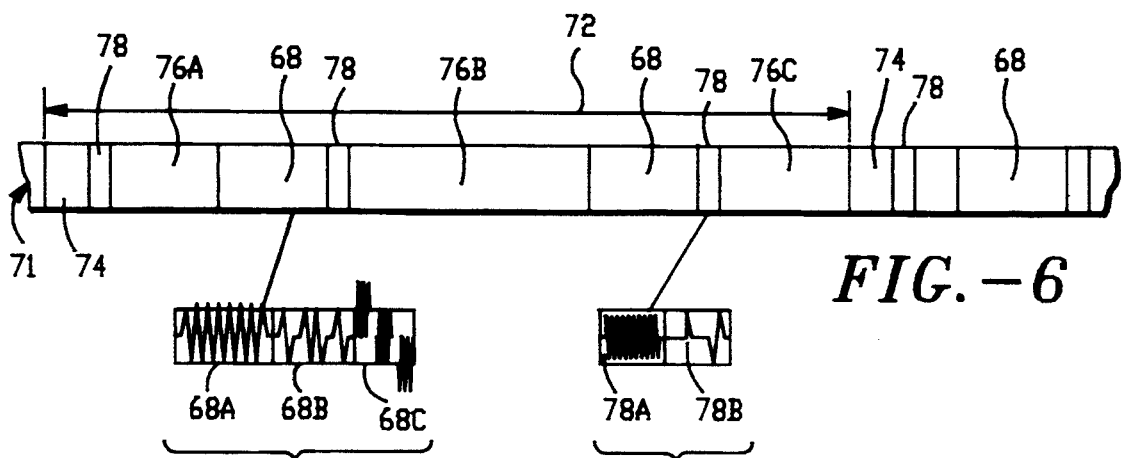
FIG. 6A-B is an enlarged lineal depiction of a segment of one data track within the multiplicity of data tracks defined within the FIG. 5 data layout plan, illustrating one data field which has been split into segments by regularly occurring embedded servo sectors.
Figures 6A, 6B:
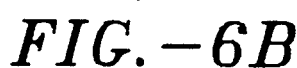

FIG. 5 also depicts a series of radially extending embedded servo sectors 68 which e.g. are equally spaced around the circumference of the disk 16. As shown in FIG. 6, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 6 data block header fields 74, and data block ID fields 78. While the number of data sectors per track varies from data zone to data zone, in the present example, the number of embedded servo sectors 68 per track remains constant throughout the surface area of the disk 16. In this present example the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface. Also, the information recorded in the servo ID field 68B of each servo sector 68 is e.g. prerecorded with servowriting apparatus at the factory at a predetermined relative low constant frequency, so that the servo information will be reliable at the innermost track location, e.g. within the innermost zone 70-9. While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g. 512 bytes of user data per data sector); and, the density and data rates vary from data zone to data zone. Accordingly, it is intuitively apparent that the servo sectors 68 interrupt and split up at least some of the data sectors or fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. A presently preferred servo sector pattern is described in the referenced, copending U.S. patent application Ser. No. 07/569,065.

As shown in FIG. 6, a data track 71 includes a data block 76 for storage of a predetermined amount of user data, such as 512 or 1024 bytes of user data, recorded serially in 0,4,4 code bits in data field segments 76A, 76B and 76C of the depicted track segment. The data block 76 is shown in FIG. 6 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field segment including the segment 76A following the ID header 74, and the segments 76B and 76C following interruption by servo sectors 68. The data header field 78 is written at the same time that data is written to the segments 76A, 76B and 76C for example, and write splice gaps therefore exist just before each data ID header 78, before ID fields, and before servo fields, for example.

MULTI-MODE GAIN LOOP

In a sample-based data detection system, such as the present PR4, ML system, the coded analog information stream read back from the data storage surface is sampled by the flash A/D converter 46 as has already been described. The conversion process includes quantization according to the number of bits resolved by the particular A/D architecture. In the exemplary disk drive system 10, six bits are preferably quantized for each sample. For optimal analog to digital conversion, the full dynamic range of the A/D converter 46 should be available. To provide for full dynamic range utilization, it is necessary to adjust the amplitude of the analog information stream presented at the input to the converter 46. This adjustment is best performed by an automatic gain loop which senses amplitudes as reported by the signal samples, since the sample values determine the recovered information content. The multi-mode automatic gain loop of the present invention includes an analog gain loop for non-read mode times, including embedded servo sample intervals, and includes a digital vernier gain loop for adjusting a sampled and held analog gain value during data read intervals.

Figure 7:
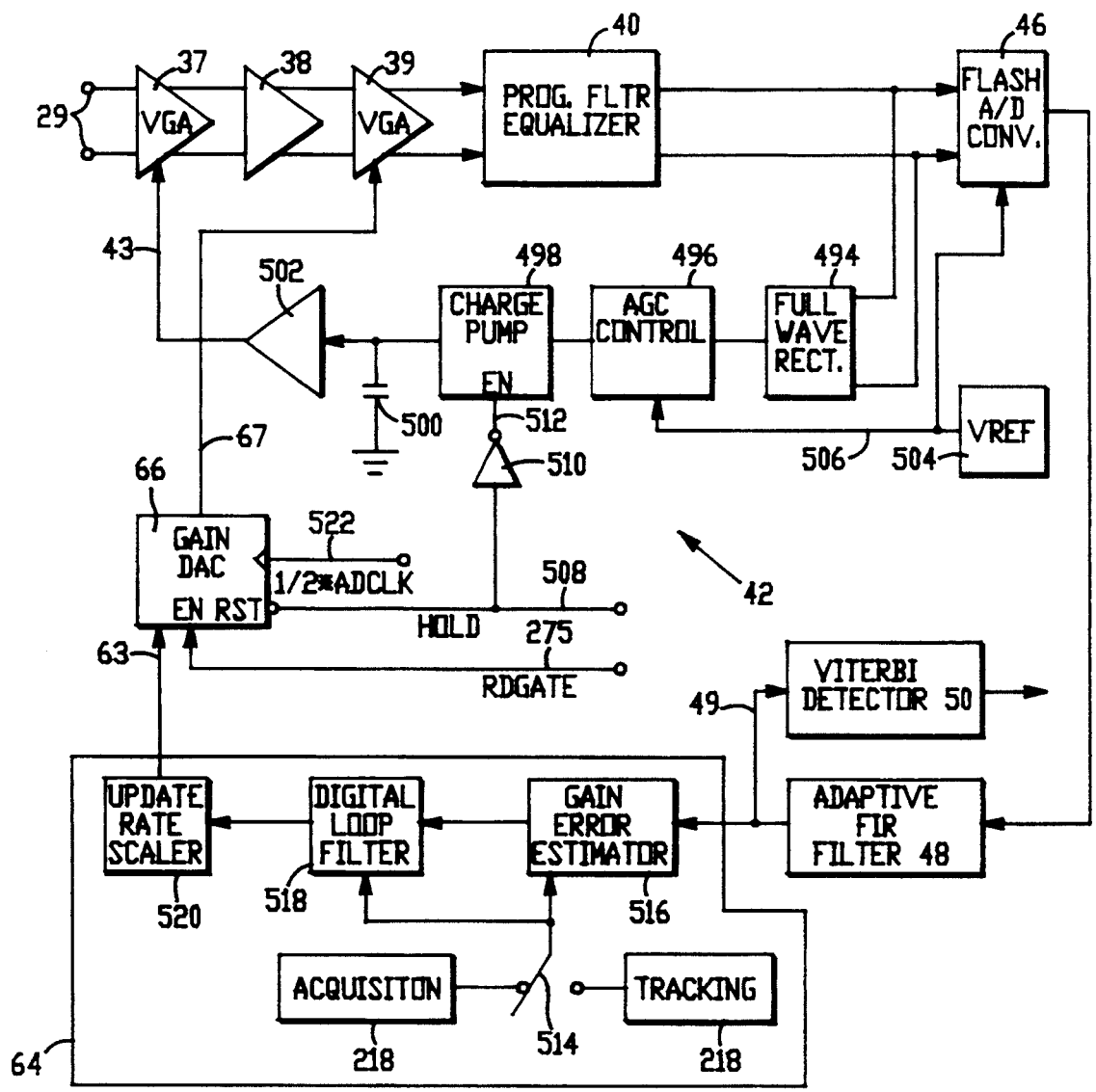
FIG. 7 is a functional block diagram of a multi-mode analog and digital gain control loop of the FIG. 4 PR4,ML disk drive architecture in accordance with aspects of the present invention.

FIG. 7 sets forth a block diagram overview of the multimode automatic gain loop which is shown more generally in the overall system 10 block diagram of FIG. 4. The preamplified analog readback signal from the preamplifier 28 is presented as a differential signal on the path 29 leading to an input of the first VGA 37, the gain of which is controlled by the analog gain circuit 42. This analog gain circuit includes the full wave rectifier 494, AGC control circuit 496, charge pump 498, capacitor 500 and buffer amplifier 502. The analog AGC loop 42 is thus connected to receive low pass filtered and equalized analog data at the output of the programmable analog filter/equalizer 40. The analog gain control is applied to the first VGA stage 37 over a path 43.

The analog data stream is full wave rectified in order to remove transitional direction (sign) by a full wave rectifier 494. An analog AGC control circuit 496 compares the absolute amplitude of the incoming full wave rectified analog signal with a voltage reference provided from a voltage reference circuit 504 over a path 506. This same voltage reference is also applied to the flash A/D converter 46. A difference between the amplitude reference voltage set by the reference circuit 504 and the measured analog signal level will result in a signed error signal that will cause a charge pump 498 to charge or discharge a reference level storage element, e.g. capacitor 500, connected at the output of the charge pump 498. The charge pump is enabled whenever a HOLD signal on a path 508 is not true, so that when the control signal HOLD is asserted, the charge pump 498 is inhibited and neither sinks nor sources current from or to the capacitor 500. During HOLD, the charge placed on the capacitor 500 is held without change (other than any very slow and insignificant leakage drainage). The voltage charge held across the capacitor 500 is buffered by a buffer amplifier 502 and applied as an analog AGC control value for controlling the first VGA 37.

The VGA stage 37 leads through the constant gain stage 38 to a second VGA 39 which is controlled by a digital gain vernier signal on a path 67 from the gain DAC 66 within the digital gain loop including the digital gain circuit 64 and gain DAC 66. During read mode, when digital samples are being acquired, or are being tracked, the analog charge pump is inhibited, and the digital gain control circuit 64 is active. This gain circuit 64 adjusts the gain of the read signal by using a stochastic gradient technique; and, it includes a gain error estimator function 516 which is connected at the output of the adaptive FIR filter 48. The gain error estimator function 516 compares the magnitudes (amplitudes) of the incoming digital information samples with predetermined values held in the digital register file 804. Errors between acquired values and reference values are gain errors. These gain errors are then passed through a digital loop filter function 518.

The digital gain update provided by the gain error estimator function 516 is performed using a gradient algorithm which is known in the art. After RDGATE is asserted true, the digital loop 64 operates first to acquire the appropriate gain level at initiation of a data read operation, and then to track any signal amplitude variations.

The digital synchronization field previously noted is provided at the beginning of the data track. This field appears in the readback signal as a constant frequency at one fourth of the sample frequency. Ideal sample values are e.g. +2, +2, −2, −2, +2, +2, −2, −2, etc., where "2" represents the ideal VGA normalized signal amplitude at the time of sampling. This preferred constant frequency readback signal field is employed by the multi-mode gain loop during its gain acquisition mode in order rapidly to acquire an appropriate read channel gain setting.

During acquisition mode, the digital gain error estimator function 516 calculates a value $\mu k^a$ during acquisition mode, in accordance with the following equation:

$$\mu k^a = (y_k - dkval \cdot \hat{y}_{a,k}) \tilde{y}_{a,k} \qquad (1)$$

where:

$$\hat{y}_{a,k} = sgn(y_k - \tilde{\eta}_k) \qquad (2)$$

$$\tilde{\eta}_k = E \cdot \hat{y}_{a,k-2} \qquad (3)$$

dkval = programmable constant reference value
E = a constant.

The digital loop filter function 518 establishes the gain of the digital AGC control loop, and also sets the corner frequency thereof. The preferred loop filter is a first order filter, described by $$g_{k+1} = g_k + \gamma^a \mu k^a \qquad (4)$$

where $$\gamma^a = 2^{-n5} \text{ in which } 0 \leq n5 \leq 7 \qquad (5)$$

The output $f_k$ of the update rate scaler function 520 is $g_k$ for even data samples and $f_{k-1}$ for odd data samples, thereby resulting in a desired reduction by one half of the data rate prior to conversion to analog by the gain DAC 66.

In a steady state, tracking mode, the tracking gain error is given by:

$$\mu k^t = (y_k - dkval \cdot \hat{y}_k) \hat{y}_k \qquad (6)$$

where
$\hat{y}_k$ is 1 if $y_k >$ THP; 0 if $-$THP$\leq y_k \leq$ THP; and $-1$ if $y_k < -$THP.

The output from the digital loop filter function 518 in tracking mode is given by:

$$g_{k+1} = g_k + \gamma^t \mu k^t \quad (7)$$

where $$\gamma^t = 2^{-n6} \text{ where } 0 \leq n6 \leq 7 \quad (8)$$

As shown in the functional block diagram of FIG. 7, the gain error estimator function 516 and the digital loop filter function 518 receive gain error values from the acquisition mode gain quantization circuit 216 and from the tracking mode gain quantization circuit 218. A switch function 514 switches between the two circuits 216 and 218. These circuits 216 and 218 receive program values from the register file 804 which set gain error estimation values for use of a two level reference, and the gain loop bandwidth to a wide level during acquisition; and set gain error estimation values for use of a three level reference and gain loop bandwidth to a narrower level during tracking, in order to provide greater loop stability and immunity to noise artifacts, for example.

The use of a digital gain control loop has a number of advantages. First, a gain (or timing) control loop controlled via digital samples is less sensitive to variations in temperature, power supply and component tolerances than is a strictly analog control loop. Second, loop compensation or bandwidth may be easily adjusted or varied simply by loading registers, or by switching between banks of registers for "on the fly" changes. This means that optimal loop compensation may be used during both acquisition and tracking modes. Finally, the digital loop filter eliminates errors otherwise due to bias and offset that may exist in an analog-only loop filter implementation.

The update rate scaler function 520 selects every other gk value put out by the digital loop filter function 518 and passes the selected values on to the gain DAC 66 over the path 63. In this manner, the gain DAC 66 may be clocked at one half of the sample clocking rate which reduces power consumption and circuit complexity and expense. At the same time susceptibility to transients and noise is reduced. The half-data-rate clocking signal is supplied to a clock input of the DAC 66 over a path 522. By operating the gain DAC 66 at a reduced update rate, control loop latency is increased effectively by one A/D clock cycle, which slightly, but negligibly reduces overall phase margin of the digital gain control loop 64.

The gain DAC 66 puts out a control current over a path 67 to control the gain of the second VGA 39. In this manner, the digital loop acts as a vernier for high resolution adjustment of the coarse gain value already established by the analog gain loop and held across the capacitor 500.

Basically, there are two logical signals that control the multi-mode gain loop: HOLD on the path 508 and RDGATE on the path 275. The analog gain loop 42 is used to establish a gain setting when the system is not phase locked to the incoming signal. One important time when this occurs is when an embedded servo sector is being read. In this instance the frequency of the servo sector information is typically different from the frequency of the selected data zone 70. The analog gain loop 42 permits adjustment of the VGA 37 to an appropriate level, so that the servo circuit 24 can recover the embedded servo information and correct head position as may be required. When a user data field is approached and sampling detection is to begin, the gain loop switches over to the digital portion which then adds to or subtracts from the coarse gain value established by the analog gain loop 42 and held across the capacitor 500. As noted, once switchover to digital mode has occurred, the analog charge pump 498 is inhibited, and no longer sources or sinks current to or from the capacitor 500.

Figure 8:
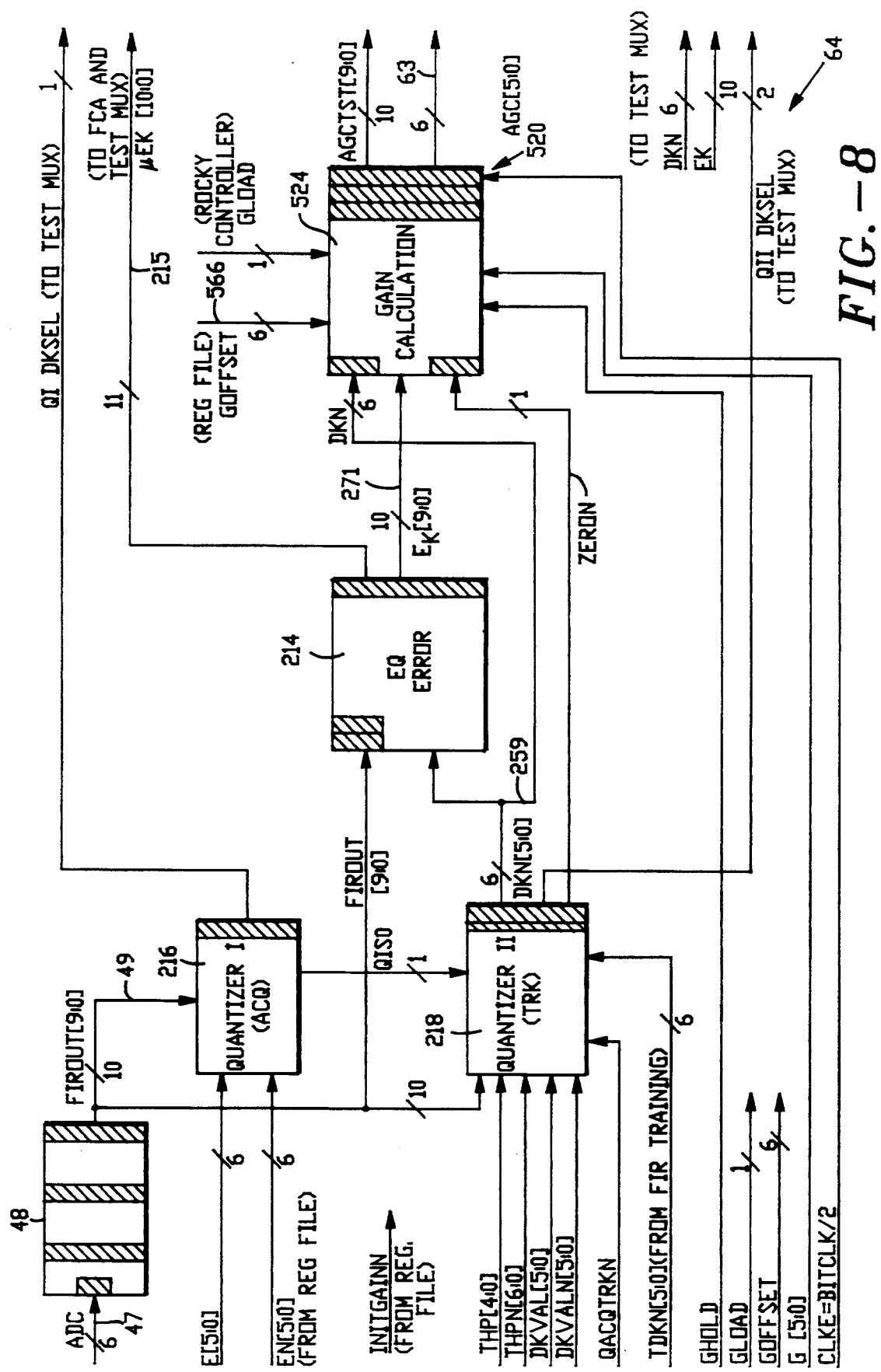
FIG. 8 is a more detailed structural block diagram overview of the digital gain control block shown in FIG. 7.

FIG. 8 shows a preferred implementation of the gain loop digital control block 64 in greater structural detail. The circuitry depicted in FIG. 8 differs somewhat from the functional blocks 516, 518 and 520 illustrated in FIG. 7. In preferred structural implementation, the blocks 516, 518 and 520 are implemented within the equalizer error block 214 and a gain calculation block 524. These blocks 214 and 524 generate the filtered and scaled digital gain error value $f_k$ on the path 63 which is converted by the gain DAC 66 into a value for controlling the VGA 39 during periods when the read gate signal on the path 275 is true.

Figure 9:
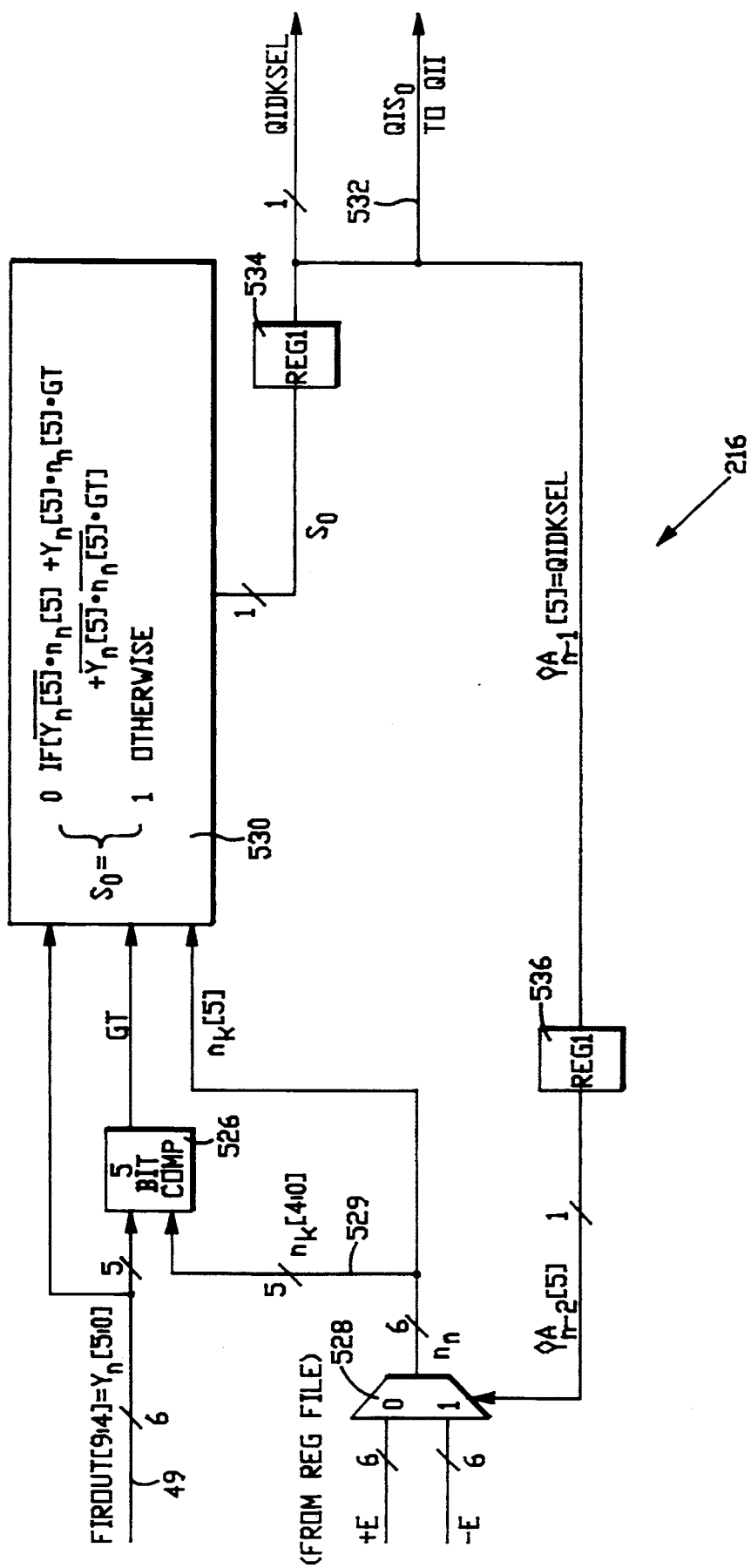
FIG. 9 is a detailed block diagram of an acquisition quantizer calculation circuit within the digital gain control block shown in FIG. 7.
Figure 10:
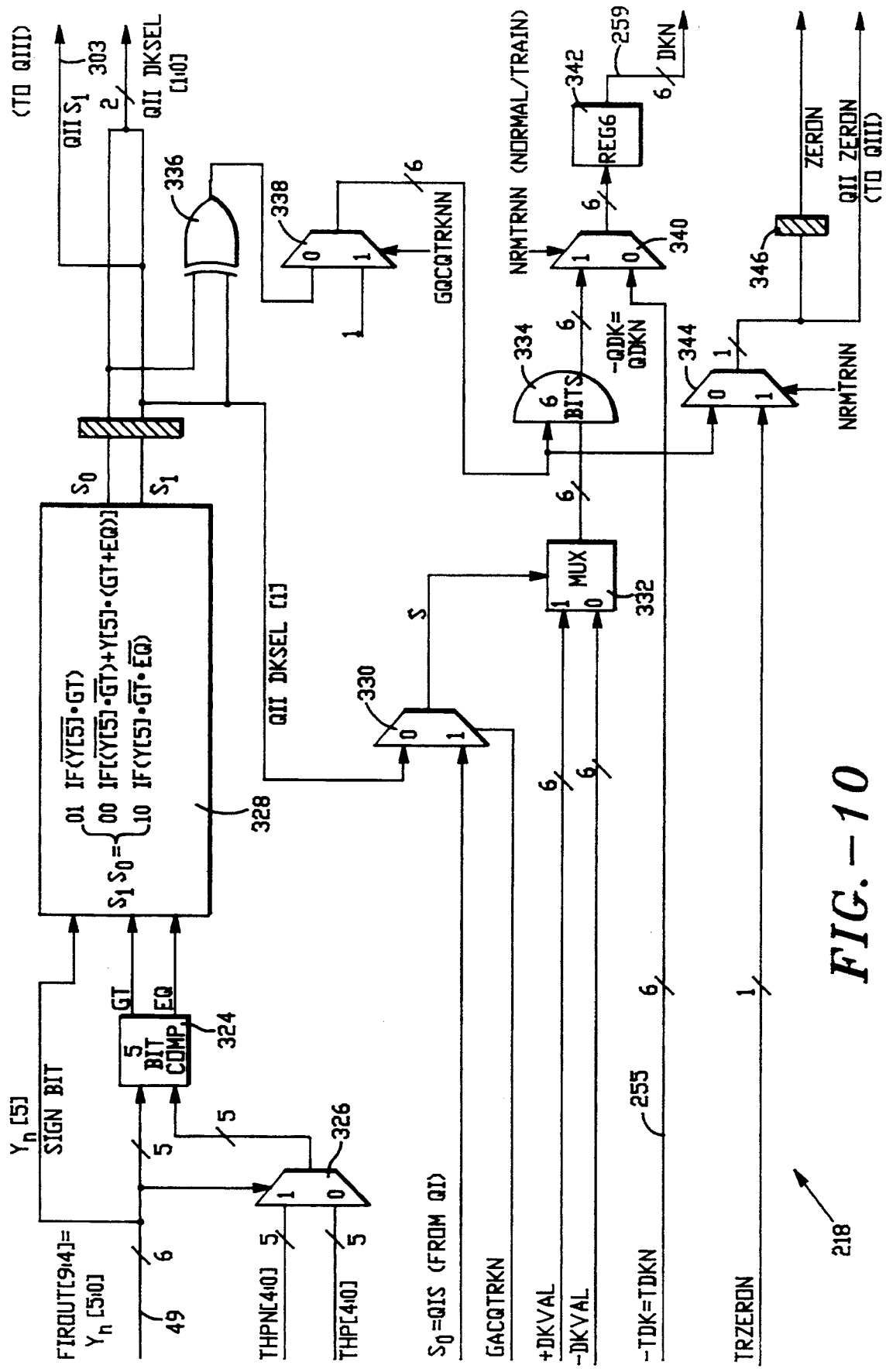
FIG. 10 is a detailed block diagram of a tracking mode quantizer circuit block shown in the FIG. 8 block diagram.

FIG. 9 describes the acquisition mode gain quantizer 216. This circuit includes a 5 bit comparator 526 which receives the $\{y_k\}$ data samples from the FIR filter 48 on the path 49. A multiplexer 528 receives plus and minus threshold values E which are stored in the register file 604, and puts out a selected threshold $\bar{\eta}k$. The comparator 526 compares the magnitude of the incoming data samples $Y_k$ with the threshold $\bar{\eta}k$ and puts out a greater than (GT) signal to a logic circuit 530. The most significant bit of the threshold $\bar{\eta}k$ is also applied directly to the circuit 530. The circuit 530 calculates a bit value So and puts it out on a path 532 to the tracking mode gain quantizer circuit 218 (FIG. 10). This signal is also passed through a first clock delay 534 and a second clock delay 536 to provide a twice delayed signal to control operation of the multiplexer 528.

The tracking quantizer 218 is shown in FIG. 10 as including a five-bit comparator 324 which receives via the path 49 the five low order bits of the digital samples $y_k$ which have been conditioned by passing through the adaptive FIR filter 48. At the same time a high order sign bit controls a multiplexer 326 which selects between positive and negative programmable threshold values +THP and −THP which are stored in the register file 804 of the digital IC 17. The result of the comparison provided by the circuit 324 and the logic array 328 is $\hat{y}_k$.

In addition, a second value dksel is passed through a multiplexer 330 during tracking mode and used to control a six-bit multiplexer 332 which selects between positive and negative reference values +dkval and a −dkval which are part of the digital gain loop. The selected dkval is passed through an AND gate 334 which ands a high order bit from a selector 338 with the values put out by the multiplexer 332. The high order bit from the selector is provided by an exclusive OR gate 336 which compares the bit values S0 and S1 put out by the logic array 328. A selector 340 selects between the selected dkval signals and a six-bit $\overline{\text{TDK}}$ value, depending upon whether the FIR filter is in a normal mode or is in a training mode. A six bit delay register 342 provides one clock cycle delay to the output from the selector 340 and passes the delayed VALUE to the equalizer error circuit 214 and to the gain calculation circuit 524 over the path 259.

During user data reading operations, the state of the multiplexer 340 selects and puts out a decision based on the FIR filter output as the $\overline{DK}$ value over the path 259 to the equalizer error circuit 214, FIG. 8. This estimated decision value is then processed by the equalizer error circuit 214 to produce a new $e_k$ value on the path 215 to a filter coefficient adaptation circuit of the FIR filter 48.

Figure 11:
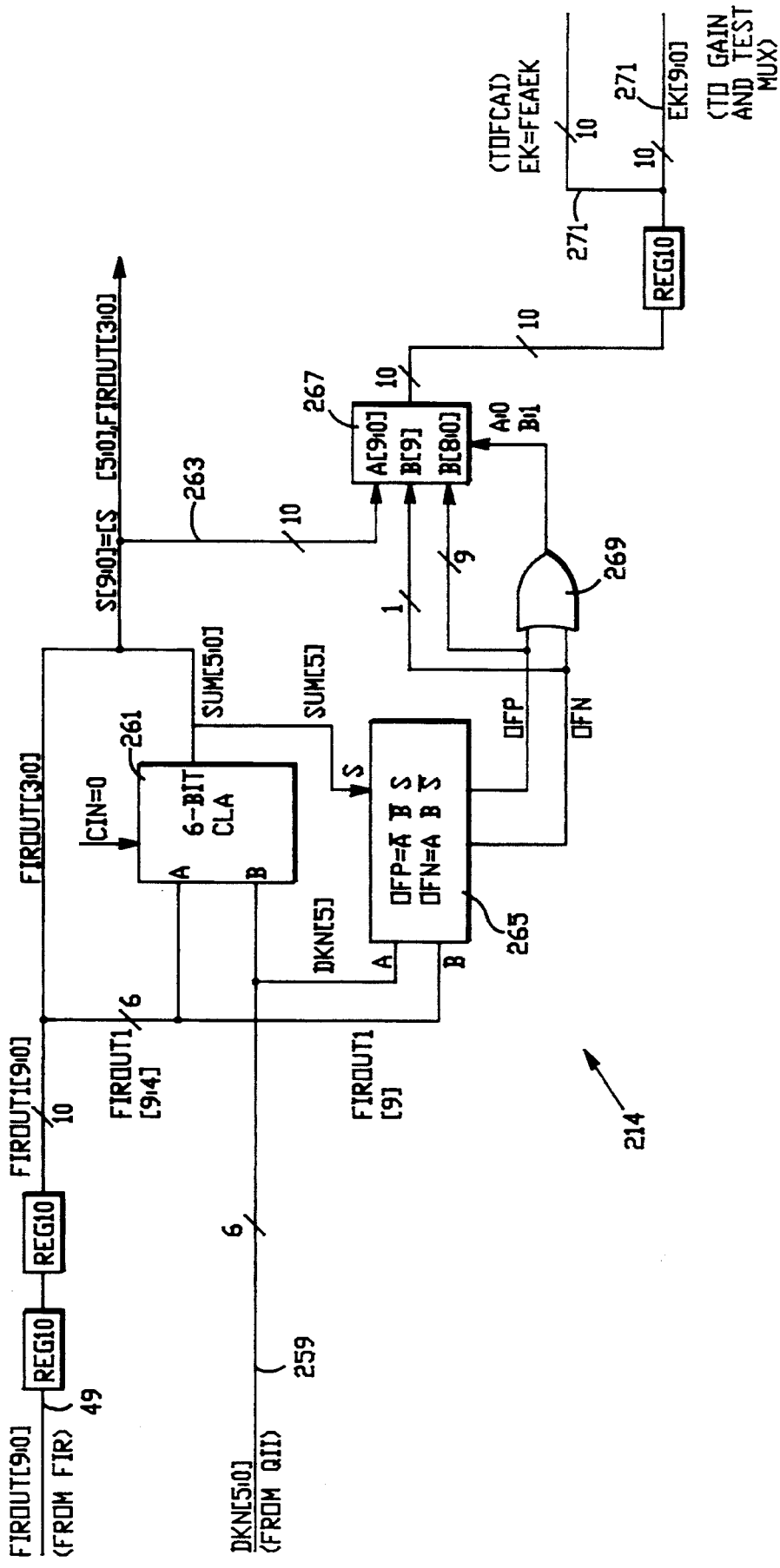
FIG. 11 is a detailed block diagram of an equalizer error calculation circuit within the digital gain control block shown in FIG. 8.

With reference to FIG. 11, the equalizer error circuit 214 also adds the $\overline{DK}$ value on the path 259 to the six high order bits of the 10 bit signal on the path 49 in a six-bit carry lookahead adder circuit 261 to produce a 10 bit result on a path 263 on which the low order four bits from the FIR filter 48 are mapped around the adder circuit 261 and appended to the resultant six bit sum therefrom. An overflow circuit 265 checks for overflow and puts out a positive or negative overflow saturation value through a multiplexer 267 as the overflow case may be. An OR gate 269 controls selection of the multiplexer 267 between the error value on the path 263 and the saturation values from the overflow circuit 265. The resultant $e_k$ value is then passed through a single clock cycle delay latch and then supplied over a path 271 to the gain calculation circuit 524.

Figure 12:
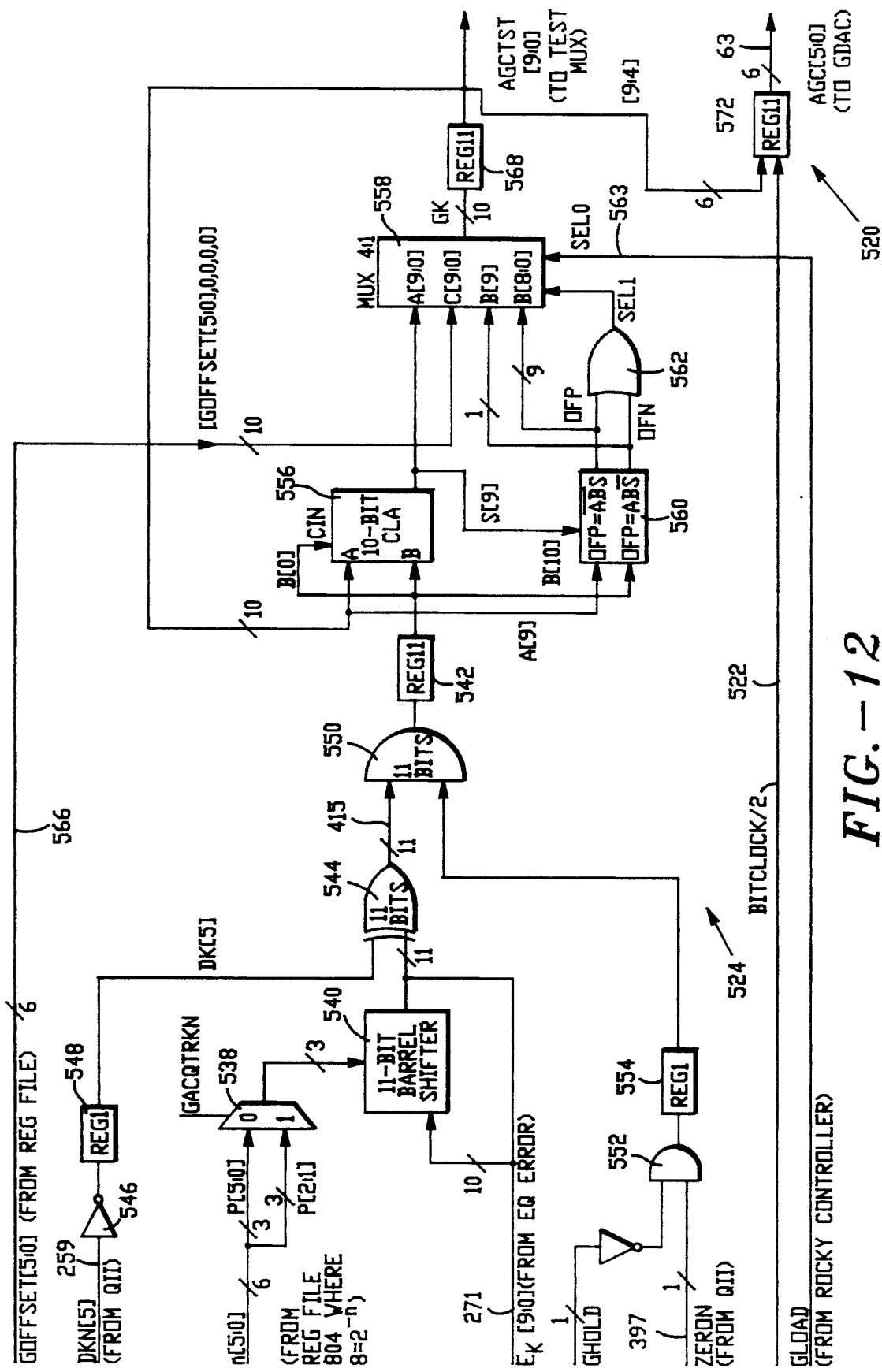
FIG. 12 is a detailed block diagram of a gain calculation circuit within the gain control block shown in FIG. 8.

Details of the gain calculation circuit 524 are set forth in FIG. 12. A register file 804 of the digital chip 17 provides gain scaling step exponent values n5 and n6 which enter a multiplexer 538 which puts out $\gamma$ as a three bit scaling factor to an eleven bit barrel shifter 540. The barrel shifter 540 multiplies incoming error values $e_k$ on the path 271 from the equalizer error circuit 214 by the scaling factor values and passes the product through an exclusive OR array 544 having 11 bit positions. The dkn sign bit on the path 259 is inverted by an inverter 546 and delayed by a delay register 548 before being passed into the exclusive-OR array 544 to perform the multiplication of equations (1) and (6) above. The resultant product is put out on a path 415 to an 11 bit AND gate array 550. The zeron value on the path 397 from the tracking mode gain quantizer 218 is passed through an AND gate 552, and a delay latch 554 before reaching another input of the AND gate array 550.

The output from the AND gate array 550 is passed through a delay 542 and into a 10 bit carry lookahead adder 556. A feedback value is applied as another input to the adder 556 which provides a calculated gain error output. One input of a multiplexer 558 receives the output directly from the CLA adder 556 while another input of the multiplexer 558 receives a programmable Gain offset value directly from the register file over a path 566. An overflow circuit 560 generates overflow values which are applied as another input to the multiplexer 558 and to an OR gate 562 which provides one control for controlling the multiplexer 558. Another control for the multiplexer 558 is provided over a path 563 from the controller 802 of the digital IC 17 for enabling loading of the programmable gain offset value from the register file 804 into the multiplexer via the path 566.

The output from the 4:1 multiplexer 558 represents the value $g_k$, and it is passed through a delay register 568 to provide a one clock cycle delay. The delayed output is then fed back as the feedback path input to the 12 bit carry lookahead adder 556. The multiplexer output $g_k$ is also passed through another delay register 572 which is clocked at one half of the sample clocking rate, which thereby provides the update rate scaler function 520. The output from the register 572 takes the path 63 to the gain DAC 66 as shown in FIG. 7.

Figure 13:
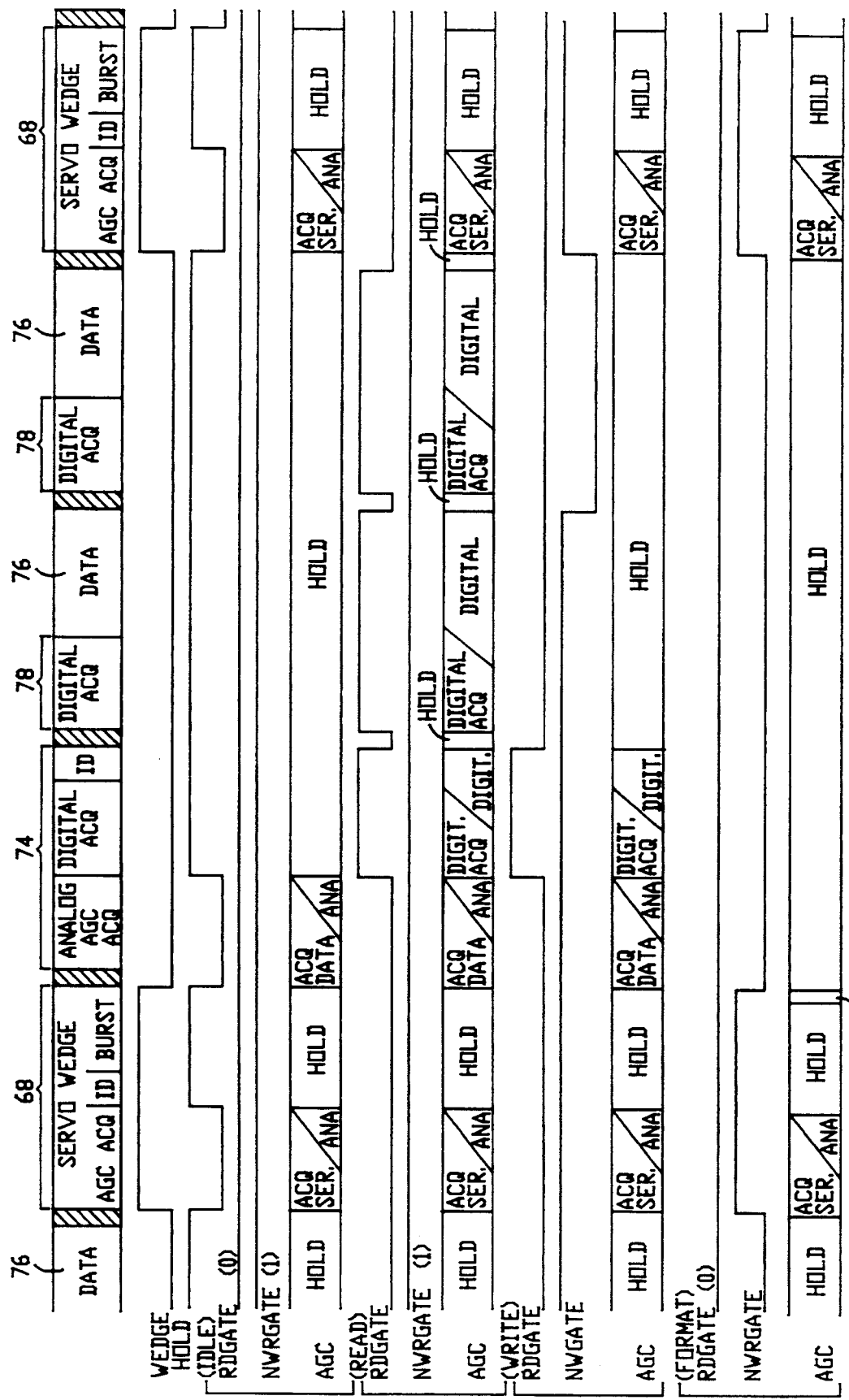
FIG. 13 is a series of timing graphs illustrative of several of the operational modes of the FIG. 7 analog and digital gain control loop during disk drive operations of the FIG. 4 PR4,ML disk drive.

With reference to FIG. 13, four exemplary operational modes of the system 10 are shown in reference to a segment of a data track similar to the segment graphed in FIG. 6. The hatched regions of the track segment correspond diagrammatically to write splice regions where there may be frequency/phase discontinuities attributable to overwrite operations occurring during data writing or formatting operations. Each embedded servo wedge field 68 includes e.g. at least three portions: an AGC acquisition field, a track ID field, and a centerline-reference burst field. The ID field 74 includes an analog AGC acquisition field, a digital acquisition field, and a track/block ID number field. The track/block ID number field identifies the data block fields 76 that follow the ID field 74. These data fields, as shown in FIG. 6, take up the available track space before the next servo sector 68 is reached, and there may be any number of them including fractional blocks, or "split data fields". The data block fields include a digital acquisition field 78 followed by user data. A special marker called "sync byte" is written just after the digital acquisition field to indicate that the data is now beginning.

Directly below the graphed data track segment are logical levels for a servo WEDGE timing window signal, and the HOLD signal which controls the operation of the analog charge pump 498. The operational modes graphed in FIG. 13 include IDLE, READ, WRITE, and FORMAT; and the state of the read gate RDGATE signal is graphed, as well as the overall operational state of the multi-mode gain loop, graphed "AGC".

Just before the servo field 68, HOLD is high, and RDGATE is low. This means that the analog charge pump 498 is disabled, the DAC reset is inactive, and the gain DAC 66 is fixed at a reference level. Since neither the DAC 66 nor the analog AGC loop 42 are operating, gain of the VGA 38 is determined solely by whatever voltage is being held in the capacitor 500, and the AGC loop is said to be in "hold". At the beginning of the servo field 68, HOLD goes low. This causes the DAC 66 to reset and the analog AGC loop 42 to become active. At this time the analog AGC loop is set to the predetermined reference value established by the reference circuit 504 by charging or discharging the capacitor 500 as appropriate. Thus, the servo signal amplitude is acquired. The servo AGC acquisition field within the servo sector 68 is sufficiently long for the analog AGC loop 42 to settle to a quiescent operating point before reaching the servo track ID field. Near the beginning of the track ID field, as determined by a counter, HOLD is asserted true, thereby disabling the analog charge pump 498. The AGC loop is then in "hold" and the gain stays at the value it was just prior to the assertion of HOLD, so that the signal size variations in the centerline burst field can be detected and recorded without any amplitude modification being caused by the AGC loop.

At the end of the servo burst field 68, HOLD is deasserted, reenabling operation of the analog AGC loop 42. At this time, the analog AGC loop is acquiring gain from the ID field, which is generally different from the gain acquired for the servo field 68. The ID analog AGC acquire field within the ID field 74 is sufficiently long so that the analog loop settles at a new quiescent gain value before the digital acquire field is reached. At the end of the analog acquire field, HOLD is once again reasserted.

During a data read operation, at this point, the read gate signal RDGATE on the path 275 is asserted true. At this point, the analog charge pump 498 is disabled by virtue of HOLD being asserted, and the gain DAC 66 is enabled. Having been reset during "hold", the gain DAC 66 initially puts out the reference current, so that the gain of the VGA 38 is not affected by a discontinuity at switchover to the digital AGC loop. After several A/D clock cycles of delay, the digital gain error estimator 516 begins putting out valid gain error words. These gain error words are processed through the digital loop filter and then decimated and passed on to the gain DAC 66 via the update rate scaler 520. At this point the digital AGC loop 64 is closed around the filtered digital samples being put out from the adaptive FIR filter. At this time the gain error estimator 516 and the digital loop filter 518 are set with values provided from the acquisition quantizer 216 which are appropriate to obtaining rapid acquisition of gain. Just before the digital ID field is reached, again as determined by a counter, these values are switched to tracking values provided by the tracking quantizer 218, which are normally values selected to provide lower loop bandwidth and lower loop gain. Throughout the duration of this field, and throughout subsequent data fields, the HOLD value remains asserted true and the analog AGC loop 42 is disabled. However, the voltage held on the capacitor 500 continues to affect gain of the VGA 38 as a static offset value. In this manner gain acquisition times are minimized, and the required dynamic range of the gain DAC 66 is significantly reduced. Also, by operating the gain DAC 66 at half of the data clocking rate reductions are realized in power consumption, susceptibility to glitch energy and noise, and circuit design complexity.

In read mode, the read gate signal RDGATE toggles low at each subsequent write splice in order to bypass timing glitches that would otherwise adversely affect the timing loop. These glitches generally do not affect the AGC operation. However, when RDGATE goes low inputs to the gain DAC 66 are disabled, causing a "hold" condition for the duration of the write splice. At the beginning of each data block field, the digital acquire process is repeated, followed by digital tracking. The digital AGC loop 64 remains in operation until the next servo sector 68 is encountered.

With the foregoing description of operation of the multimode gain loop during read mode, those skilled in the art will appreciate and understand from FIG. 13 the operation of the gain loop during idle, write and format operational modes.

By providing an analog AGC control loop 42 which is effectively nested within a sampled data digital AGC control loop, the variable gain amplifier 37 may be effectively controlled during intervals when digital samples may be unavailable or asynchronous, which may occur during servo sector times in drives employing embedded servo sector technology. Also, as noted, the acquired operating point of the analog gain loop 42 continues to be used during digital sampling mode as a coarse reference point which is refined and updated in an additive fashion by the digital loop, thereby reducing acquisition time and simplifying the design of the digital circuitry.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A multi-mode gain control loop for a partial response, maximum likelihood data recording and playback channel comprising:
   an input for receiving during a playback mode from a data storage medium an analog signal stream including coded user data intervals and channel overhead data intervals to be detected,
   variable gain amplifier means for amplifying the analog signal stream in accordance with an analog coarse gain setting and an analog vernier gain setting,
   analog to digital converter means for receiving the amplified analog signal stream and for generating and putting out digital data samples therefrom,
   analog gain control loop means connected to receive the amplified analog signal stream, for generating a coarse analog gain control value from the amplified analog signal stream during the channel overhead data interval and for storing the analog coarse gain control value in an analog storage means, the analog gain control loop means for applying the stored analog coarse gain control value from the analog storage means to the variable gain amplifier means as a fixed analog coarse gain setting throughout the playback mode, and
   digital gain control loop means connected to receive the digital data samples for generating sampled gain control values therefrom during at least the coded user data interval and for applying the sampled gain control values through a gain digital to analog converter means to provide an analog vernier gain setting to adjust gain of the variable gain amplifier means relative to the fixed analog coarse gain setting.

2. The multi-mode gain control loop set forth in claim 1 wherein the digital gain loop means further comprises update rate scaler means for selecting a subset of the sampled gain control values and for applying said subset through said gain digital to analog converter means at a clocking rate lower than a clocking rate of said digital data samples to produce the analog vernier gain setting.

3. The multi-mode gain control loop set forth in claim 1 wherein the playback mode includes during a portion of the channel overheard data interval an initial gain acquisition sub-mode followed by a gain tracking sub-mode, and wherein the digital gain loop further comprises acquisition sub-mode gain error quantization means connected to provide gain quantization values from the data samples during acquisition sub-mode and tracking sub-mode gain error quantization means connected to provide gain quantization values from the data samples during tracking sub-mode, the gain error quantization values being converted into the gain sample values by the digital gain loop means.

4. The multi-mode gain control loop set forth in claim 1 wherein the analog to digital converter means puts out raw digital data samples and further comprising digital finite impulse response filter means for receiving, filtering and conditioning the raw digital data samples to produce conditioned digital data samples, the digital gain loop being connected to receive said conditioned digital data samples during at least the coded user data interval.

5. The multi-mode gain control loop set forth in claim 1 wherein the variable gain amplifier means comprises a first variable gain amplifier means being controlled by the analog coarse gain setting, and second variable gain amplifier means being controlled by the analog vernier gain setting.

6. The multi-mode gain control loop set forth in claim 1 wherein at least a portion of the channel overhead data interval includes a digital gain loop automatic gain control signal, and wherein the digital gain control loop means is connected to receive digital data samples of the digital gain loop automatic gain control signal and to generate sampled gain control values therefrom in addition to generating sampled gain control values during the coded user data interval.

7. A multi-mode gain control loop for a PR4,ML data channel including a data non-read mode and a data read mode, and comprising:
an input for receiving from a source an analog signal stream including coded data to be detected,
VGA means for amplifying the analog signal stream,
analog to digital converter means for receiving the amplified analog signal stream and for generating and putting out digital data samples therefrom,
an analog gain loop connected to receive the amplified analog signal stream and including:
full wave rectification means for removing the polarity of analog values in the stream to provide an absolute gain value,
analog loop comparison means for comparing the absolute gain value with a reference value supplied from a reference source to provide a signed analog gain control value,
charge pump means for pumping a charge in response to the signed analog gain control value during the data non-read mode,
charge storage means for storing the charge pumped by the charge pump means,
buffer amplifier means connected to the charge storage means for amplifying an analog gain control value related to the charge stored in the charge storage means to control the VGA means, and
a digital gain loop connected to receive said digital data samples and including:
digital gain error estimator means for generating estimated gain error values from the digital data samples received during read mode in comparison with reference values,
digital loop filter means for generating filtered gain error values,
gain DAC means for converting the filtered gain error values into an analog vernier gain control signal and for applying it to control the VGA means, and
gain loop control means for enabling the charge pump means of the analog gain loop and for inhibiting the gain DAC means of the digital gain loop during the data non-read mode and for inhibiting the charge pump means and enabling the gain DAC means during the data read mode.

8. The multi-mode gain control loop set forth in claim 7 wherein the data read mode includes an initial gain acquisition sub-mode followed by a gain tracking sub-mode, and further comprising acquisition sub-mode gain error quantization means connected to provide the digital gain error estimator means with gain quantization values from the data samples during acquisition sub-mode, and tracking sub-mode gain error quantization means connected to provide the gain error estimator means with gain quantization values from the data samples during tracking sub-mode.

9. The multi-mode gain control loop set forth in claim 7 wherein the digital gain loop further comprises update rate scaler means for selecting a subset of said filtered estimated gain error values, and for applying said subset through said gain DAC means at a clocking rate lower than a clocking rate of said digital data samples.

10. The multi-mode gain control loop set forth in claim 7 wherein the analog to digital converter means puts out raw digital data samples and further comprising digital FIR filter means for receiving, filtering and conditioning the raw digital data samples to produce conditioned digital data samples, the digital gain loop being connected to receive said conditioned digital data samples.

11. The multi-mode gain control loop set forth in claim 7 wherein the VGA means comprises a first VGA amplifier means being controlled by the analog gain control value from the analog loop, and second VGA amplifier means being controlled by the analog vernier gain control signal.

12. The multi-mode gain control loop set forth in claim 9 wherein the update rate scaler means includes means for applying the subset through the gain DAC means at a clocking rate which is one half a clocking rate of the digital data samples.

13. The multi-mode gain control loop set forth in claim 8 wherein the gain error estimator means generates during acquisition sub-mode estimated gain error values $\mu_k^a$ in accordance with:

$$\mu_k^a = (y_k - dkval \cdot y_{a,k})\hat{y}_{a,k}$$

wherein
$y_{a,k} = \text{sgn}(y_k - \bar{\eta}_k)$ $$\text{sgn}(x) = \left\{ \begin{array}{l} +1 \text{ for } x \geq 0 \\ -1 \text{ for } x < 0 \end{array} \right\}$$

$\eta_k = E \cdot \hat{y}_{a,k} - 2$
dkval = programmable constant reference value
$y_k$ = a presently filtered and conditioned digital data sample
k = a time index variable, and
E = a constant.

14. The multi-mode gain control loop set forth in claim 8 wherein the gain error estimator means generates during tracking sub-mode estimated gain error values $\mu_k^t$ in accordance with:

$$\mu_k^t = (y_k - dkval \cdot y_k)\hat{y}_k$$

wherein $\hat{y}_k$ is 1 if $y_k > \text{THP}$; 0 if $-\text{THP} \leq y_k \leq \text{THP}$; and $-1$ if $y_k < -\text{THP}$ and dkval is a programmable constant reference value, $y_k$ is a presently filtered and conditioned digital data sample, and k is a time index variable.

15. The multi-mode gain control loop set forth in claim 13 wherein the digital loop filter means generates the filtered gain error values $g_k$ during acquisition sub-mode in accordance with:

$$gk+1 = gk + \gamma^a \mu k^a,$$

where $\gamma^a = 2^{-n5}$ in which $0 \leq n5 \leq 7$.

16. The multi-mode gain control loop set forth in claim 14 wherein the digital loop filter means generates the filtered gain error values gk during tracking sub-mode in accordance with:

$$gk+1 = gk + \gamma^t \mu k^t,$$

where $$\gamma^t = 2^{-n6} \text{ where } 0 \leq n6 \leq 7.$$

17. A method for controlling gain in a partial response, maximum likelihood data playback channel comprising the steps of:
   receiving from a data storage medium an analog signal stream including coded user data and channel overhead data to be detected during a playback mode of said channel,
   amplifying with a controllable amplification means the analog signal stream,
   quantizing and putting out data samples from said amplified analog signal stream with a signal sampling and quantization means,
   generating an analog gain reference from the analog signal stream during an interval when channel overhead data is being received with an analog gain control loop means,
   storing the analog gain reference as a fixed level in an analog storage means,
   applying the stored fixed level to control gain of the controllable amplification means throughout the playback mode,
   generating gain vernier correction values from said data samples with a digital gain control loop means during an interval at least when coded user data is being received,
   applying the gain vernier correction values through a gain digital to analog converter means when coded user data is being received to adjust gain of the controllable amplification means set by the analog gain reference fixed level.

18. The method set forth in claim 17 comprising the further step of scaling the gain vernier correction values with an update rate scaler means and applying scaled gain vernier correction values through the gain digital to analog converter means.

19. A multi-mode gain control loop for a partial response, maximum likelihood data recording and playback channel comprising:
   an input for receiving during a playback mode from a data storage medium an analog signal stream including coded user data to be detected,
   variable gain amplifier means for amplifying the analog signal stream,
   analog to digital converter means for receiving the amplified analog signal stream and for generating and putting out raw digital data samples therefrom,
   digital finite impulse response filter means connected for receiving, filtering and conditioning the raw digital data samples to produce conditioned digital data samples,
   analog gain loop means connected to receive the amplified analog signal stream, for generating an analog gain control value from the amplified analog signal stream, for storing the analog gain control value in a storage means, and for applying the stored analog gain control value to the variable gain amplifier means to provide a gain setting,
   digital gain loop means connected to receive the conditioned digital data samples for generating sampled gain control values therefrom during the playback mode while coded user data is being received and for applying the sampled gain control values through a gain digital to analog converter means to adjust the gain setting of the variable gain amplifier means.

20. The multi-mode gain control loop set forth in claim 19 wherein the playback mode includes an initial gain acquisition sub-mode followed by a gain tracking sub-mode, and wherein the digital gain loop further comprises acquisition sub-mode gain error quantization means connected to provide gain quantization values from the conditioned digital data samples during acquisition sub-mode and tracking sub-mode gain error quantization means connected to provide gain quantization values from the conditioned digital data samples during tracking sub-mode, the gain error quantization values being converted into the gain sample values by the digital gain loop means.

* * * * *